United States Patent [19]

Verboom

[11] Patent Number: 4,557,832
[45] Date of Patent: Dec. 10, 1985

[54] APPARATUS FOR REMOVING OIL FROM WATER

[75] Inventor: Pieter Verboom, Alblasserdam, Netherlands

[73] Assignee: IHC Holland N.V., Papendrecht, Netherlands

[21] Appl. No.: 573,820

[22] Filed: Jan. 25, 1984

[30] Foreign Application Priority Data

Jan. 25, 1983 [NL] Netherlands .................. 8300266

[51] Int. Cl.$^4$ .............................................. E02B 15/04
[52] U.S. Cl. .................................. 210/242.3; 210/923; 210/776
[58] Field of Search ................... 210/923, 242.3, 396, 210/397, 179, 208, 209, 784, 217, 402, 776, 294, 295, 416.1, 416.5

[56] References Cited

U.S. PATENT DOCUMENTS

| | | | |
|---|---|---|---|
| 3,338,414 | 8/1967 | Lefke et al. | 210/923 |
| 3,703,464 | 11/1972 | Bhuta et al. | 210/137 X |
| 3,831,756 | 8/1974 | Bhuta et al. | 210/109 |
| 3,905,902 | 9/1975 | Hoegberg et al. | 210/242.3 |
| 4,039,454 | 8/1977 | Miller et al. | 210/242.2 |
| 4,368,122 | 1/1983 | Raragnan | 210/242.3 |
| 4,456,536 | 6/1984 | Lorenz et al. | 210/923 |
| 4,473,469 | 9/1984 | Ayroldi | 210/242.3 |

FOREIGN PATENT DOCUMENTS

| | | |
|---|---|---|
| 2282506 | 3/1976 | France . |
| 2389719 | 12/1978 | France . |
| 1504777 | 3/1978 | United Kingdom . |
| 1574819 | 9/1980 | United Kingdom . |
| 2061752 | 5/1981 | United Kingdom . |

OTHER PUBLICATIONS

"Het bestrijden van olieverontreinigingen op de Noordzee (I)"; H. M. Menagie; *OTAR*, (Periodical for Road and Water Construction), vol. 64, No. 6, 1979, pp. 372, 373, Figure c2, (no translation).

Primary Examiner—Richard V. Fisher
Assistant Examiner—Sharon T. Cohen
Attorney, Agent, or Firm—Young & Thompson

[57] ABSTRACT

The invention relates to an apparatus for removing oil from water, comprising a horizontal roller cooperating with a scraper blade as well as a receiving tray, the improvement being that the roller has its upper surface at the level of the water surface and is placed above the receiving tray and that between roller and the suction pump side of the receiving tray a grate has been placed, which cuts the collected oil into dischargeable pieces.

3 Claims, 1 Drawing Figure

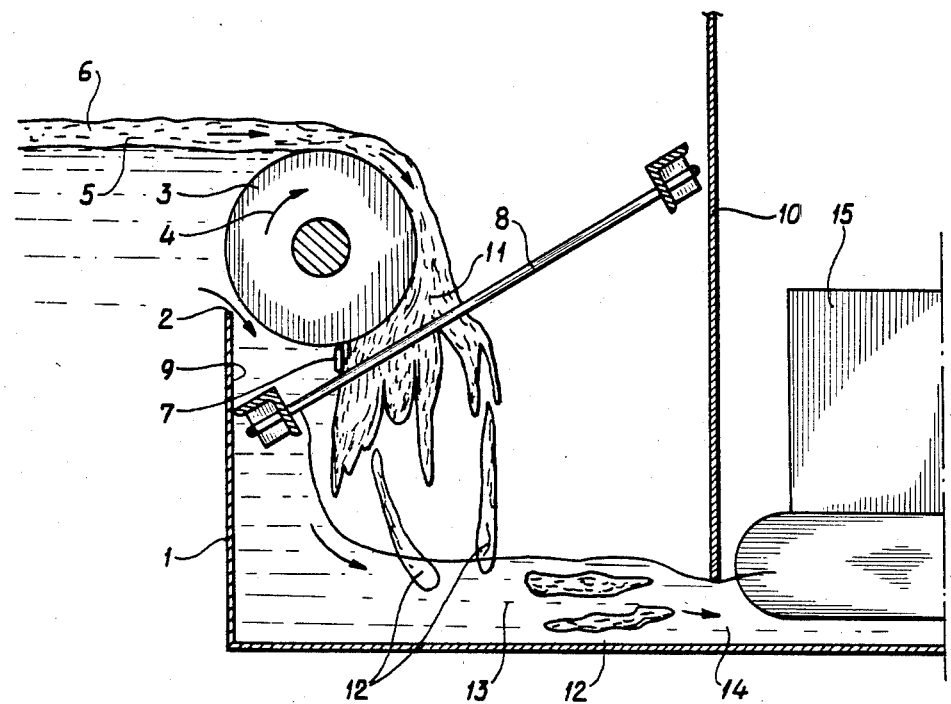

APPARATUS FOR REMOVING OIL FROM WATER

The invention relates to an apparatus for removing oil from water, comprising a roller which can be driven and has a horizontal axis of rotation, a scraper blade cooperating with the surface of the roller and a receiving tray.

An apparatus of this kind is known from the article "Het bestrijden van olieverontreinigingen op de Noordzee (I)" by H. M. Menagie in OTAR (Periodical for Road and Water Constuction), Vol. 64, Nr. 6, 1979, in particlar pages 372 and 373, FIG. c2. (Translation title of the article: "The fight against oil pollution on the North Sea (I)").

This known apparatus is based on the principle that the oil layer floating upon the water is sticky to a more or less degree and accordingly adheres to the roller, which roller in the known apparatus is partly dipped into the water, which roller lifts the oil layer adhering to it out of the water whereafter a scraper blade ensures that the oil flows into a tray placed below it. With said known device a thin oil film is conveyed and accordingly the capacity is relatively low. Under arctic circumstances the oil layers, however, can be comparably very thick. The thick oil mass which is recieved by the receiving tray can be pumped only partially or not at all. Pollution is partly lifted as well and can enter the receiving tray. The edge of the receiving tray in dependence of the thickness of the oil layer has to be at a distance from the roller and accordingly from the scraping blade, which may have as a result that parts of the oil fall back and do not enter the receiving tray.

Using the principle adherence several proposals have been made, as appears from the said article. In practice sweeping systems, such as sweeping arms, have been very successful. With said sweeping arms the collected oil is guided towards a receiving tray having an overflow edge, the level of which and the water level are adjusted by means of a float, so that the oil flows over the edge into the tray and from there can be removed by means of pumps. To avoid that pollution such as floating wood and the like enter the receiving tray and possibly block the pump, a grate is placed in front of the tray. The highly viscous oil having layer thicknesses of several centimeters up to a decimeter, however, does not pass such a grate due to the high viscosity and the adherence, so that the apparatus becomes blocked. If said grate is omitted the risk exists that the pump and/or the pressure conduit behind may be blocked.

The purpose of the invention is to provide an apparatus based on the principle of adherence in which the difficulties of the known apparatuses no longer occur.

According to the invention this purpose is achieved in that the roller has its upper surface at the level of the water surface and is placed above the receiving tray which is located below the water surface, a suction pressure pump being connected to said receiving tray and that immediately below the roller and below the scraper blade operating against the lower half of the roller, however, above the inlet of the pump a grate has been placed.

The roller having its upper portion at the level of the water surface, adheres to the underside of the oil layer and feeds it downwardly into the receiving tray and against the scraping blade, the transportation downwardly being caused not only by adherence, but also by gravity. Due to the fact that the sticky surface of the roller is much larger than that of the scraping blade a downwardly directed pushing action is generated due to which the oil mass is pressed through the immediately following grate and in this manner is divided into bits and strings. Mixed with the water flowing through the receiving tray said bits and strings can be handled by the pump. The grate stops pollution but in the context of the present invention the most important function of the grate is that the stiff oil mass is divided into smaller bits. Accordingly it is of importance that the grate rods be thin and if possible knifesharp and according to a preferred embodiment the grate rods are formed by steel wires, for instance having a diameter for 3 mm.

Due to the fact that the roller operates against the lower surface of the oil layer and that gravity also functions to assist in pushing the oil through the grate rods, a possible reduction of the adherence of the oil to the roller at very low temperature will less quickly have a disadvantageous effect. According to the invention, however, the roller can be heated so that under all circumstances sufficient adherence is guaranteed.

To adjust to changes in adherence and thickness of the layer the speed of revolution of the roller can be controlled.

To be able to adapt the device to the thickness of the layer it is preferable that the assembly of roller, scraper blade and grate be adjustable in a vertical direction.

If needed the surface of the roller can be enlarged by providing it in a circumferential direction with ridges or similar profiles.

The invention now will be further elucidated with reference to the drawing, which shows the principle upon which the invention is based.

The drawing shows a receiving tray 1, which may form part of a wiping arm, however, it also can be part of another device and for instance can be placed in the sidewall of a vessel. This receiving tray 1 has an overflow edge 2 and a roller 3 placed immediately above it, which roller can be driven in the direction of the arrow 4, the upper portion of said roller being at the level of the water surface 5. Upon said water there is an oil layer 6, which has to be removed and which has the tendency to adhere to the surface of the roller 3.

Against the underside of the roller a scraper blade 7 operates and immediately below it a grate 8 has been placed, located between the front wall 9 of the receiving tray 1 and the rear wall 10.

The assembly of roller and grate can be removable for cleaning.

As shown in the drawing the oil mass is pushed against the scraper blade 7 by the roller 3 and due to this a mass 11 is obtained which is pushed against the grate 8, which under the influence of the pushing operation of the roller presses the oil mass through the grate and thereby divides it into bits or strings 12, which enter the water mass 13. This mixture can be discharged through the suction opening 14 with the aid of a pump 15, details of which are not shown, towards a separating and storage space.

The number of revolutions of the roller 3 preferably is adjustable, so that this can be adapted to variations in adherence and thickness of the layer.

The assembly of roller 3, scraper blade 7 and grate 8 as a rule will be adjustable in vertical direction to obtain an adjustment to the thickness of the oil layer.

I claim:

1. An apparatus for removing oil from water, comprising a roller which can be driven and has a horizontal axis of rotation, a scraper blade cooperating with the surface of the roller and a receiving tray; the improvement in which the roller has its upper surface at the level of the water surface and is above the receiving tray which is below the water surface, a suction pressure pump connected to said receiving tray, and a grate located immediately below the roller and below the scraper blade and above the inlet of the pump so that the grate subdivides the oil separated from the water by the roller as the oil passes through the grate.

2. Apparatus as claimed in claim 1, in which the grate is formed by steel wires.

3. Apparatus as claimed in claim 1, and ridges on the roller extending in circumferential direction.

* * * * *